(12) United States Patent
Vance

(10) Patent No.: US 8,468,231 B1
(45) Date of Patent: Jun. 18, 2013

(54) ARCHITECTURE FOR NETWORK-ENABLED TOOLS

(75) Inventor: Jonathan Blake Vance, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 12/761,889

(22) Filed: Apr. 16, 2010

(51) Int. Cl.
*G06F 15/16* (2006.01)
*G06F 15/173* (2006.01)

(52) U.S. Cl.
USPC ........... 709/223; 709/203; 709/217; 709/219; 709/224

(58) Field of Classification Search
USPC   73/19.1, 152.45; 320/109; 340/693.5; 702/6; 709/203, 217, 219, 223, 224
See application file for complete search history.

(56) References Cited

U.S. PATENT DOCUMENTS

| | | | |
|---|---|---|---|
| 7,007,541 B2 * | 3/2006 | Henry et al. | 73/19.1 |
| 7,138,926 B2 * | 11/2006 | Henry et al. | 340/693.5 |
| 7,305,305 B2 * | 12/2007 | Beeson | 702/6 |
| 7,531,984 B2 * | 5/2009 | Freed et al. | 320/109 |
| 7,849,934 B2 * | 12/2010 | Pastusek et al. | 73/152.45 |
| 2002/0029092 A1 | 3/2002 | Gass | |
| 2005/0173142 A1 | 8/2005 | Cutler et al. | |
| 2007/0180674 A1 | 8/2007 | Morden et al. | |
| 2009/0228133 A1 | 9/2009 | Loda | |

OTHER PUBLICATIONS

PCT Search Report and Written Opinion, International Application No. PCT/US2011/029091, International Filing Date Mar. 18, 2011.
Mulik, Using Enterprise Service Bus (ESB) for connecting Corporate Funcitons and Shared Services with Business Divisions in a large enterprise:, 2009 IEEE Asia-Pacific Services Computing Conference, pp. 430-434.
Jiang et al., "Enterprise Service Bus and an Open Source Implementation", Oct. 2006 International Conference on Management Science and Engineering, IEEE, pp. 926-930.

* cited by examiner

*Primary Examiner* — Quang N Nguyen
(74) *Attorney, Agent, or Firm* — Yee & Associates, P.C.

(57) ABSTRACT

The different advantageous embodiments provide a system comprising a wireless network, a number of tools, and a central server. The number of tools is connected to the wireless network. The number of tools is configured to perform a number of tasks and collect process data while performing the number of tasks. The central server is connected to the wireless network. The central server is configured to monitor the number of tools performing the number of tasks and receive the process data collected by the number of tools over the wireless network.

13 Claims, 5 Drawing Sheets

ARCHITECTURE FOR NETWORK-ENABLED TOOLS

BACKGROUND INFORMATION

1. Field

The present disclosure relates generally to network architecture and more particularly to network enabled tools. Still more particularly, the present disclosure relates to a data processing system for monitoring and managing network enabled tools.

2. Background

Tools used in production programs are often equipped with computer controls that electronically control process parameters for the tools. These process parameters require the tools to be checked into a remotely located tool crib and updated manually when process parameters change. A tool crib is a room or physical location in a production environment where tools are stored when not in use. The tool crib, or tool library, manages the inventory of the tools when they are checked into the tool crib.

When a tool is checked into the tool crib, process data from operation of the tool in the production environment may be downloaded or retrieved for storage and analysis. If a process parameter has been updated since the last time the tool was checked into the tool crib, the tool may receive a process update manually at the tool crib. If a process parameter changes while a tool is in operation in the production environment, the process update is not applied to the tool until the tool is next checked into the tool crib.

Some point-to-point wired Ethernet solutions exist in limited scenarios to capture process data from a tool during operation, storing the captured data on a server. This stored data may be automatically or manually captured by the tool operator. Manual method of capture includes downloading of information onto a laptop computer that is connected to the tool by Ethernet. The data stored on the laptop hard disk drive resides there until deleted or it may be further downloaded to a portable memory media such as a CD-ROM. Automated solutions incorporate software to create a point-to-point connection with a remote database on the network or a data repository within or nearby the machine.

Therefore, it would be advantageous to have a method and apparatus that addresses one or more of the issues discussed above.

SUMMARY

The different advantageous embodiments provide a system comprising a wireless network, a number of tools, and a central server. The number of tools is connected to the wireless network. The number of tools is configured to perform a number of tasks and collect process data while performing the number of tasks. The central server is connected to the wireless network. The central server is configured to monitor the number of tools performing the number of tasks and receive the process data collected by the number of tools over the wireless network.

The different advantageous embodiments further provide a method for tool management. A number of tools is implemented in a wireless network. Tool processes for the number of tools is monitored at a central location using the wireless network. Process data is received at the central location for the number of tools during the tool processes using the wireless network.

The different advantageous embodiments further provide a method for tool process updates. A tool mechanism is controlled to perform a task using a number of process parameters. Process data is collected during task performance. The process data collected is sent to a remote location.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
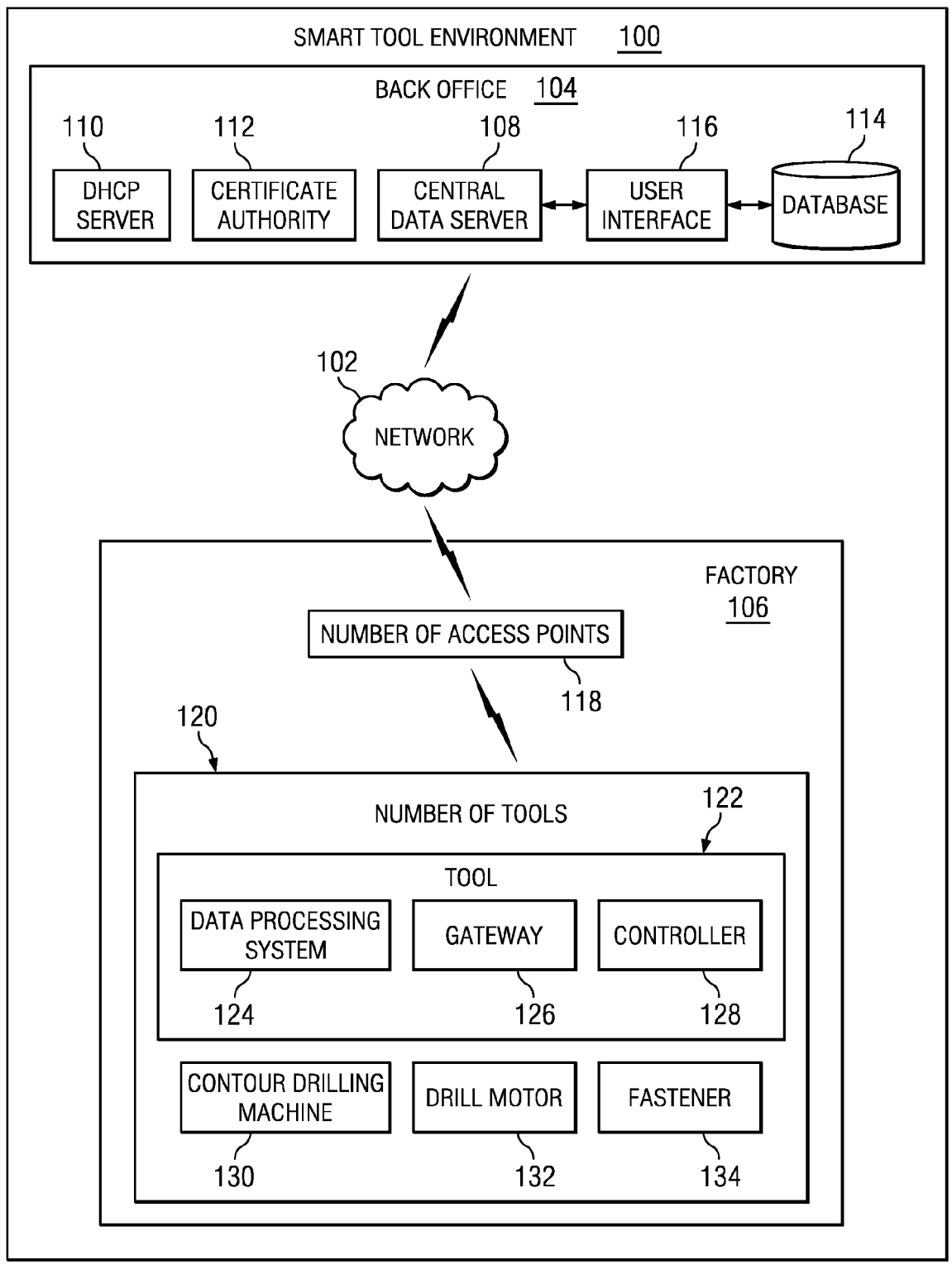
FIG. 1 is an illustration of a smart tool environment in which an advantageous embodiment may be implemented.

With reference now to the figures and, in particular, with reference to FIG. 1, an illustration of a smart tool environment is depicted in which an advantageous embodiment may be implemented. Smart tool environment 100 may be any type of environment in which tools operate. For example, smart tool environment 100 may be a production environment, a manufacturing environment, a maintenance environment, a service environment, and/or any other suitable environment.

Smart tool environment 100 includes network 102, back office 104, and factory 106. Network 102 provides wireless access between components of factory 106 and back office 104. Network 102 may be a secure wireless network with protected access using certification protocols, such as, for example, without limitation, WPA, WPA2, and/or any other suitable security protocol. Back office 104 may include central data server 108, dynamic host communication protocol (DHCP) server 110, certificate authority 112, database 114, and user interface 116. In one advantageous embodiment, back office 104 may be a computer implementing processes, such as central data server 108, dynamic host communication protocol (DHCP) server 110, and certificate authority 112, for example. In another advantageous embodiment, back office 104 may be a remote location having one or more computers, such as central data server 108, dynamic host communication protocol (DHCP) server 110, and certificate authority 112, for example.

Central data server 108 provides process parameters for tools, such as number of tools 120 in factory 106. Central data server 108 receives process data from number of tools 120, analyzes the process data, and determines whether one or more process updates are needed for number of tools 120.

Central data server 108 is a central source for monitoring and managing number of tools 120.

Dynamic host communication protocol (DHCP) server 110 allows number of tools 120 to request IP addresses and log onto network 102, in this illustrative example. Certificate authority 112 processes a number of certificates for security and manages the secure interaction of number of tools 120 with back office 104 over network 102. As used herein, a number of items means one or more items. For example number of tools 120 is one more tools.

Factory 106 includes number of access points 118 and number of tools 120. Number of access points 118 may be a number of wireless access points at a number of locations throughout factory 106 that enable number of tools 120 to have network access throughout factory 106. A wireless access point may be a device that allows wireless communication devices to connect to a wireless network using Wi-Fi, Bluetooth, or related standards. A wireless access point may connect to a router to relay data between the wireless devices, such as number of tools 120, and other devices on the network, such as back office 104, for example. Number of wireless access points 118 may be stand-alone devices or integrated devices with number of tools 120, for example. Number of tools 120 is a tool that electronically controls process parameters for tool mechanisms, for example.

Tool 122 is an illustrative example of one implementation of number of tools 120. Tool 122 includes data processing system 124, gateway 126, and controller 128. Data processing system 124 manages data collected from tool 122 during operation and data received from back office 104 during operation, for example. Gateway 126 provides access for data processing system 124 to network 102 using number of access points 118, for example. Gateway 126 may be, for example, without limitation, a dedicated computer, a router, a Wi-Fi serial bridge, and/or any other suitable gateway device.

Controller 128 controls operation of tool 122 using process parameters received from data processing system 124. Controller 128 may be, for example, without limitation, a motion controller.

Number of tools 120 may be any type of computer aided tool, such as, without limitation, contour drilling machine 130, drill motor 132, fastener 134, and/or any other suitable tool.

The illustration of smart tool environment 100 in FIG. 1 is not meant to imply physical or architectural limitations to the manner in which different embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

In some advantageous embodiments, back office 104 may be implemented as a data processing system, such as data processing system 200 in FIG. 2, below. In other advantageous embodiments, back office 104 may be implemented as a number of data processing systems connected over network 102, for example. In an illustrative example, back office 104 may be local, such as an office adjacent to factory 106, or remote, such as a server farm.

Figure 2:
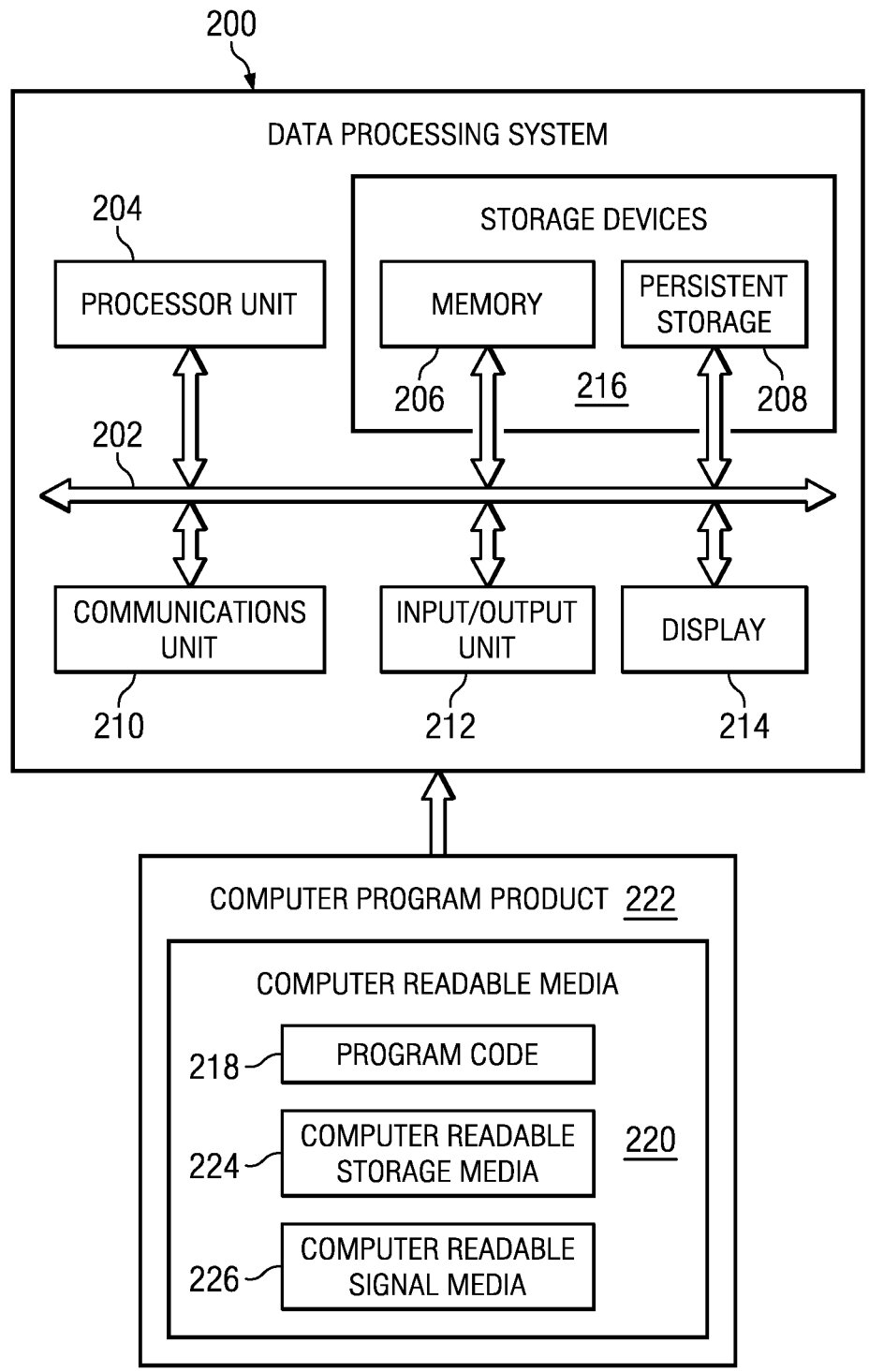
FIG. 2 is an illustration of a data processing system in accordance with an advantageous embodiment.

With reference now to FIG. 2, an illustration of a data processing system is depicted in accordance with an advantageous embodiment. Data processing system 200 may be an example of a computer, such as central data server 108 and/or data processing system 124 in FIG. 1, in which computer usable program code or instructions implementing the processes may be located for the advantageous embodiments.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 from computer readable media 220 using computer readable signal media 226. Computer readable signal media 226 may be, for example, a propagated data signal containing program code 218. For example computer readable signal media 226 may be an electro-magnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current systems for updating tool process parameters require the tools to be checked into a remotely located tool crib and updated manually when process parameters change. These updates occur locally when the tool is idle or inactive and placed into storage at the tool crib until needed again or until updates are complete. Remote updates may be sent to the tool crib, but the tool does not receive the update until it is checked into the crib after operations are finished whereupon the tool must be manually updated by a technician.

The different advantageous embodiments further recognize and take into account that current methods for monitoring tool processes require human monitoring of an individual tool for visual inspection of results or tool parameter performance, for example. Some limited computer monitoring may be provided, with the results of tool processes analyzed after the processes are complete and the information has been downloaded or manually retrieved for analysis.

Thus, the different advantageous embodiments provide a system comprising a wireless network, a number of tools, and a central server. The number of tools is connected to the wireless network. The number of tools is configured to perform a number of tasks and collect process data while performing the number of tasks. The central server is connected to the wireless network. The central server is configured to monitor the number of tools performing the number of tasks and receive the process data collected by the number of tools over the wireless network.

The different advantageous embodiments further provide a method for tool management. A number of tools is implemented in a wireless network. Tool processes for the number of tools is monitored at a central location using the wireless network. Process data is received at the central location for the number of tools during the tool processes using the wireless network.

The different advantageous embodiments further provide a method for tool process updates. A tool mechanism is controlled to perform a task using a number of process parameters. Process data is collected during task performance. The process data collected is sent to a remote location.

Figure 3:
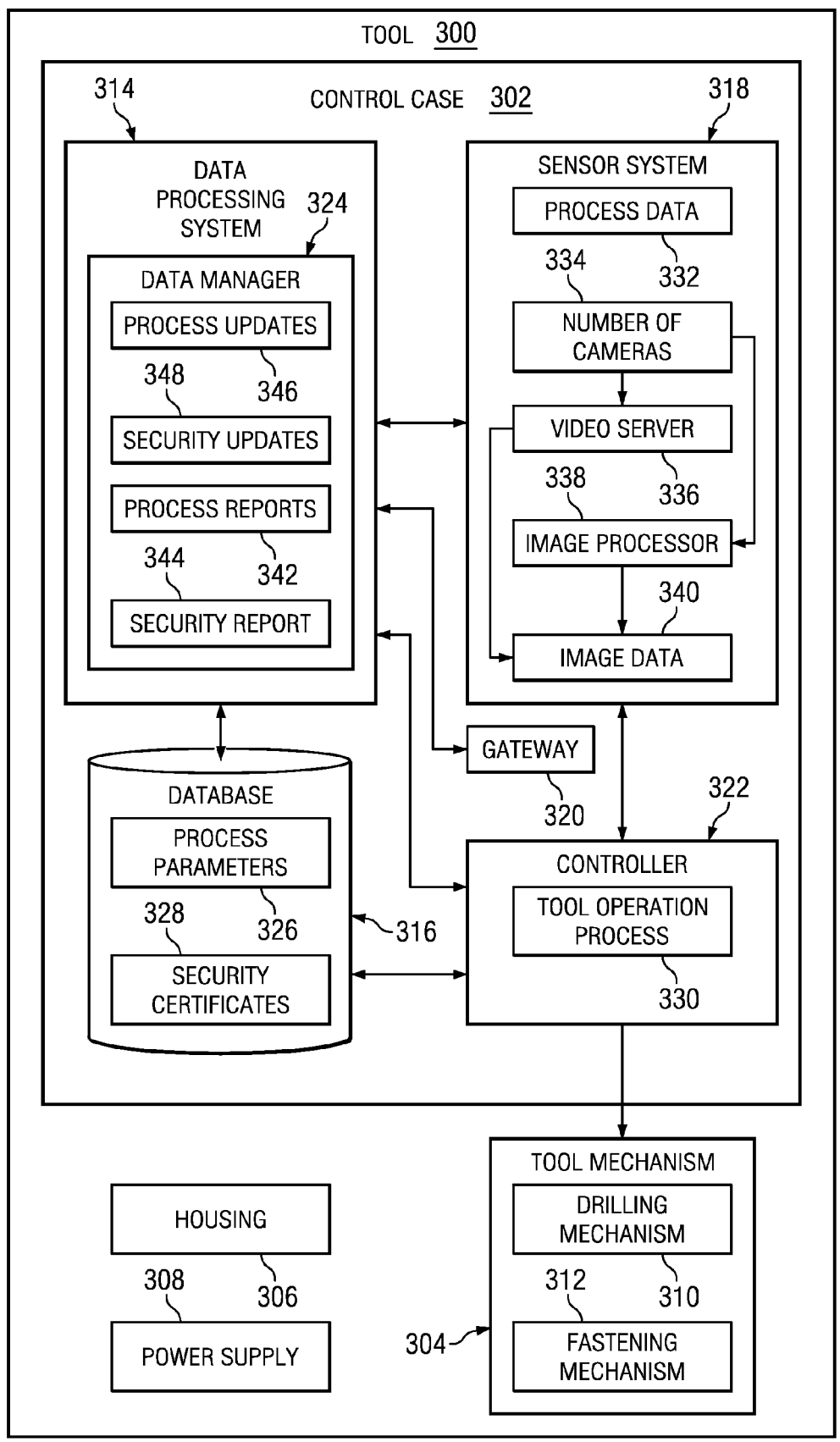
FIG. 3 is an illustration of a tool in accordance with an advantageous embodiment.

With reference now to FIG. 3, an illustration of a tool is depicted in accordance with an advantageous embodiment. Tool 300 is an illustrative example of one implementation of tool 122 in FIG. 1.

Tool 300 includes control case 302, tool mechanism 304, housing 306, and power supply 308. Control case 302 is the processing and control center for tool 300. Tool mechanism 304 is the mechanical component of tool 300 controlled by components of control case 302. Tool mechanism 304 may be, for example, without limitation, drilling mechanism 310, fastening mechanism 312, and/or any other suitable mechanism for performing tool operations.

Housing 306 may encase tool mechanism 304 and/or control case 302 to contain components of tool 300 in a single implementation, for example. Power supply 308 may include, without limitation, factory-supplied alternating current (AC) or direct current (DC) electric power, a battery, ultra-capacitor, fuel cell, gas powered generator, photo cells, and/or any other suitable electrical power connected to the source by hardwire or wireless connection. In an illustrative embodiment, tool 300 may be powered by power supply 308 using a cable, for example.

Control case 302 includes data processing system 314, database 316, sensor system 318, gateway 320, and controller 322. Data processing system 314 may be implemented using data processing system 200 in FIG. 2, for example. Data processing system 314 includes data manager 324. Data manager 324 receives collected data from sensor system 318 and manages transmission of the collected data to a centralized location, such as back office 104 in FIG. 1, for example. Data manager 324 also receives data from the centralized location and uses the data received to update process parameters and network parameters for tool 300.

Database 316 includes process parameters 326 and security certificates 328, in these illustrative examples. Process parameters 326 may be received by data processing system 314 from a centralized location, such as back office 104 in FIG. 1, and stored in database 316 for use by controller 322 in operation of tool 300. Process parameters 326 may be, for example, without limitation, an amount of torque applied to install a fastener, a degree of acceptable vibration in drilling operations, a size of a hole for drilling operations, a feed rate of a cutter into a material for drilling and milling operations, spindle speed, pilot hole formation, countersink depth, and/or any other suitable process parameters for tool 300.

Security certificates 328 provide a current authentication frame for gateway 320 to authenticate with the network, such as network 102 in FIG. 1. Authentication with the network is controlled by an authentication control server on the network, such as network 102 in FIG. 1. The certificate is sent to the network via access points, such as number of access points 118 in FIG. 1, for example.

Controller 322 operates to control tool mechanism 304 of tool 300. Controller 322 may include tool operation process 330, for example. Tool operation process 330 may process instructions and/or process parameters, such as process parameters 326, to use in controlling operation of tool mechanism 304.

Sensor system 318 collects process data 332 during operation of tool 300. Sensor system 318 may include, without limitation, number of cameras 334, video server 336, image processor 338, and/or any other suitable sensor. Other suitable sensors may include, for example, without limitation, accelerometers to collect vibration, thermocouples to detect temperature, strain gauges to detect flexion, humidity sensors, hole probes, tachometers, and Hall effect sensors. Number of cameras 334 may include, for example, without limitation, a color camera, a black and white camera, a digital camera, an infrared camera, a video camera, and/or any other suitable camera. Video server 336 may be any type of computer device dedicated to processing video images from number of cameras 334, for example. Image processor 338 gathers luminance and chrominance information from individual pixels generated for an image by number of cameras 334 and uses the information to compute the correct color and brightness values for the pixels using a number of algorithms. Luminance is a photometric measure of the luminous intensity per unit area of light traveling in a given direction. Luminance describes the amount of light that passes through or is emitted from a particular area, and falls within a given solid angle. Chrominance conveys the color information for an area or object. Video server 336 and/or image processor 338 may generate image data, for example. Image data 340 is an illustrative example of one implementation of process data 332.

Data manager 324 receives process data 332 from sensor system 318 and uses process data 332 to generate process reports 342. Process reports 342 may be transmitted by data processing system 314 to a centralized server using gateway 320. Gateway 320 is an illustrative example of one implementation of gateway 126 in FIG. 1. Process reports 342 may be analyzed by a number of applications at the centralized server to determine whether process parameters 326 require updates.

In some advantageous embodiments, gateway 320 may also manage network authentication for tool 300 using security certificates 328. Data manager 324 may generate security report 344 when authentication issues are detected by gateway 320, for example. Further, data integrity is addressed on the network media to prevent collection of erroneous data or to prevent valuable data loss.

Data manager 324 also receives process updates 346 and security updates 348 from the centralized location, such as back office 104 in FIG. 1. Process updates 346 may be used to update process parameters 326 in database 316. Process updates 346 may be received while tool 300 is in operation. Controller 322 may detect updated process parameters and adjust tool operation process 330 accordingly during operation of tool 300, for example.

The illustration of tool 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
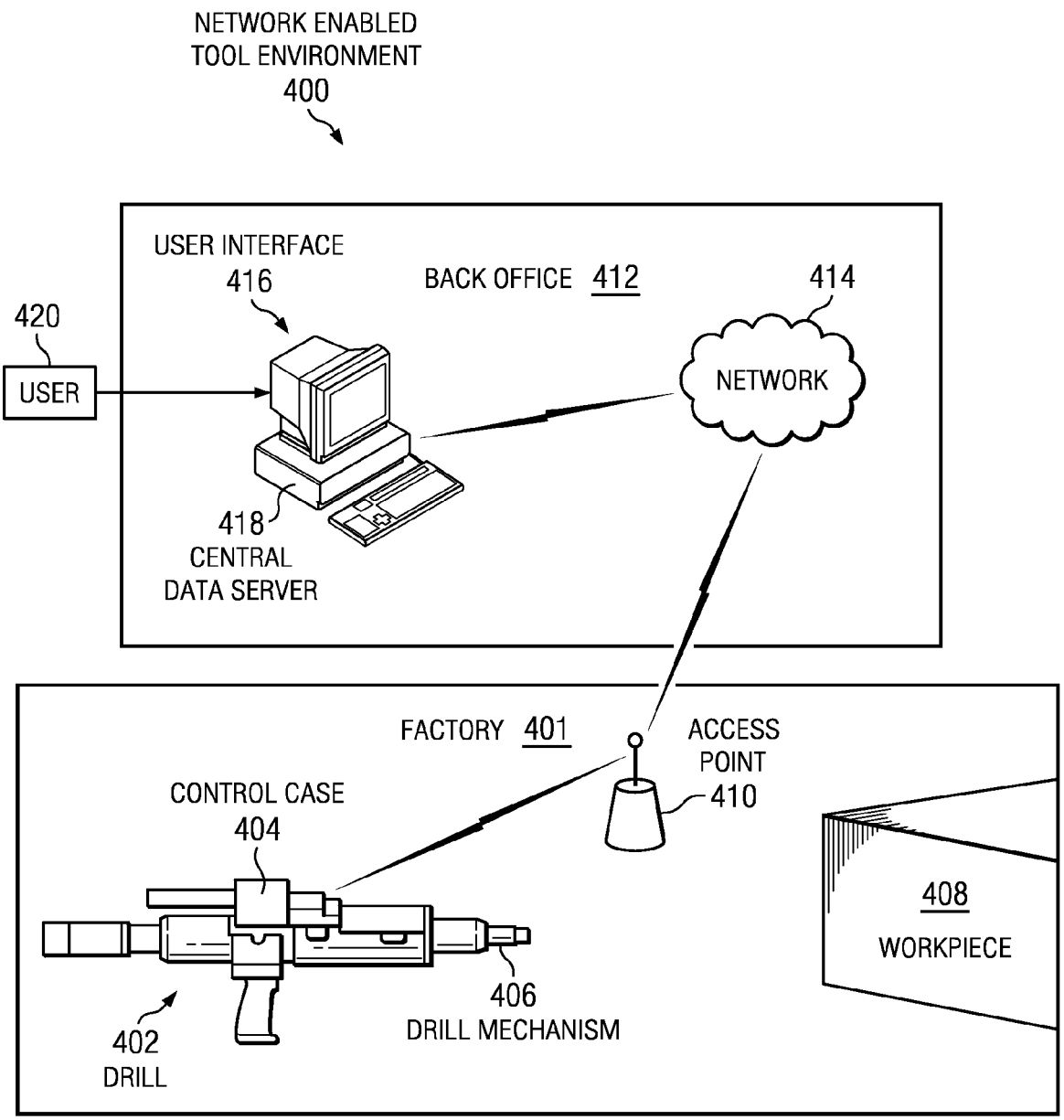
FIG. 4 is an illustration of a network enabled tool environment in accordance with an advantageous embodiment.

With reference now to FIG. 4, an illustration of a network enabled tool environment is depicted in accordance with an advantageous embodiment. Network enabled tool environment 400 is an illustrative example of one implementation of smart tool environment 100 in FIG. 1.

Factory 401 is an illustrative example of factory 106 in FIG. 1. Factory 401 includes drill 402. Drill 402 is an illustrative example of one implementation of number of tools 120 in FIG. 1. Drill 402 includes control case 404 and drilling mechanism 406. Control case 404 is an illustrative example of one implementation of control case 302 in FIG. 3. Drilling mechanism 406 is an illustrative example of one implementation of tool mechanism 304 in FIG. 3.

Drill 402 may be used to drill holes in workpiece 408, for example. Factory 401 includes access point 410, which provides network access to drill 402, in this illustrative example. Access point 410 is an illustrative example of one implementation of number of access points 118 in FIG. 1. Control case 404 may interact with back office 412 over network 414 using access point 410, for example. Control case 404 collects process data during operation of drill 402 and sends the process data collected to back office 412 using wireless network 414.

User interface 416 is connected to central data server 418, in this illustrative example. User 420 may use user interface 416 to access the process data collected and sent by drill 402. User 420 and/or central data server 418 may analyze the process data to determine whether process updates are needed for control case 404 of drill 402. If process updates are needed, the process updates may be generated at central data server 418 and sent wirelessly over network 414 to control case 404 of drill 402. These process updates may be received by drill 402 while drill 402 is in operation within factory 401, for example.

The illustration of network enabled tool environment 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
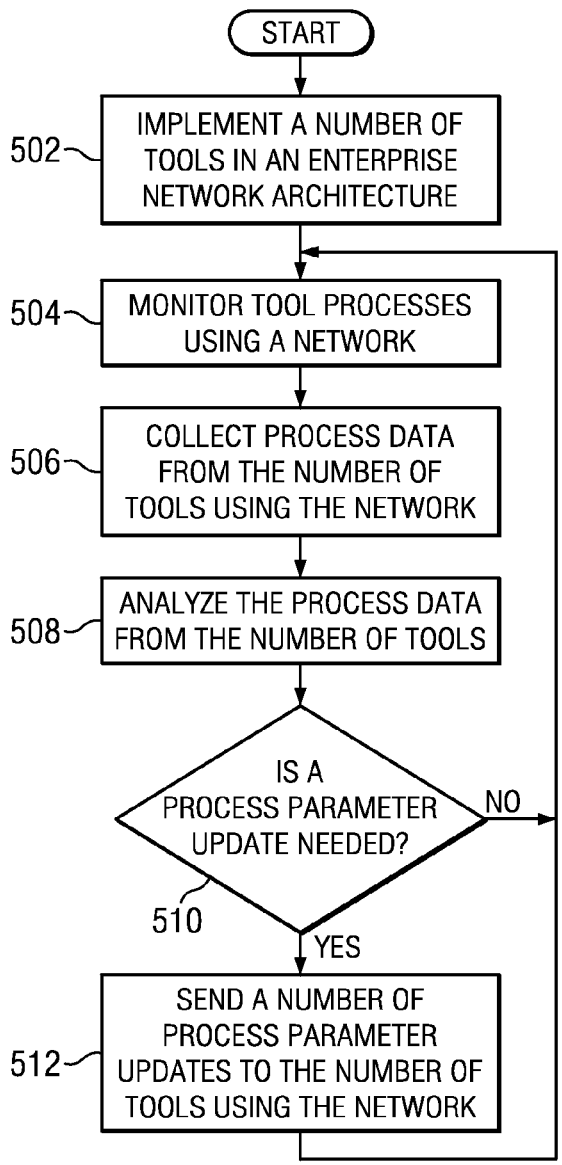
FIG. 5 is an illustration of a flowchart illustrating a process for tool management in accordance with an advantageous embodiment.

With reference now to FIG. 5, an illustration of a flowchart illustrating a process for tool management is depicted in accordance with an advantageous embodiment. The process in FIG. 5 may be implemented by a component such as back office 104 in FIG. 1, for example.

The process begins by implementing a number of tools in an enterprise network architecture (operation 502). Tools on the network may be nodes that are available to interact with other network endpoints, such as data integration appliances, enterprise process middleware, and database software, for example. The number of tools may perform the role of data server or behave as a client to centralized configuration management services. The process monitors tool processes using a network (operation 504). The process may monitor tool processes over a wireless network, such as network 102 in FIG. 1, for example. The process collects process data from the number of tools using the network (operation 506). The process data may be collected by sensor systems implemented on the tools, such as sensor system 318 of tool 300 in FIG. 3, for example.

The process analyzes the process data from the number of tools (operation 508). The process data may be analyzed by a centralized server, such as central data server 108 in FIG. 1, and/or by a user accessing the process data on the centralized server, such as user 420 in FIG. 4. The process determines whether a process parameter update is needed (operation 510). A process parameter update may be needed if process data indicates that a tool is not operating within a certain specified parameter, or a tool is not operating to produce a result within a certain specified parameter, for example.

If a determination is made that a process parameter update is not needed, the process returns to operation 504. If a determination is made that a process parameter update is needed, the process sends a number of process parameter updates to the number of tools using the network (operation 512), and then returns to operation 504.

The process in FIG. 5 may iteratively repeat as long as a tool is in operation, for example. The process may terminate when a tool is idle or inactive for a given period of time, for example.

Figure 6:
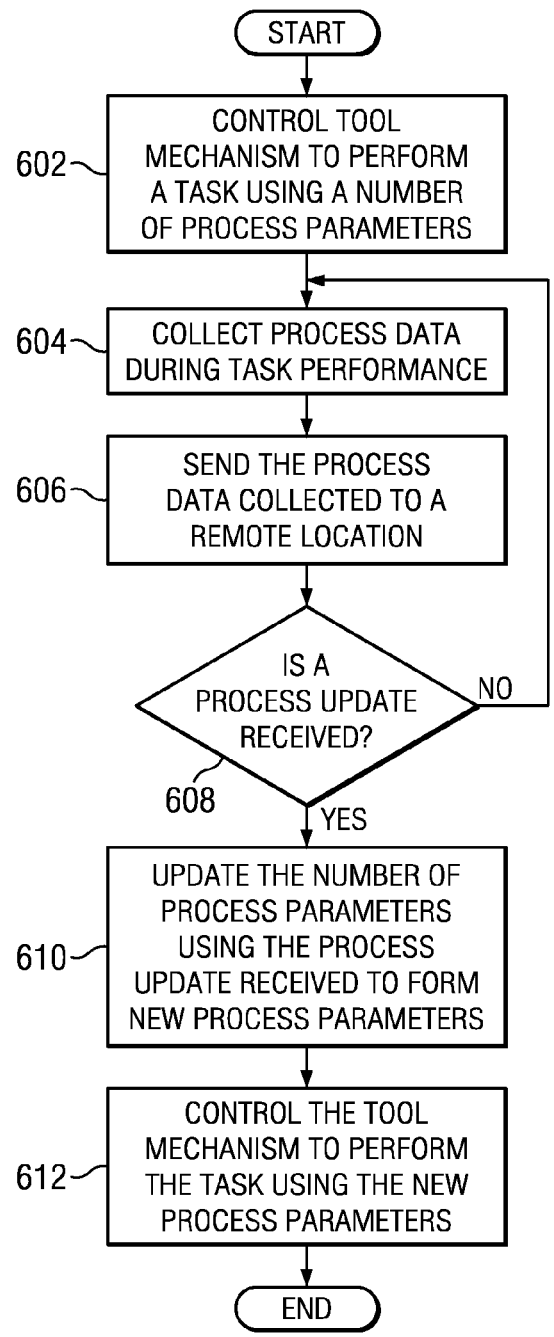
FIG. 6 is an illustration of a flowchart illustrating a process for tool process updates in accordance with an advantageous embodiment.

With reference now to FIG. 6, an illustration of a flowchart illustrating a process for tool process updates is depicted in accordance with an advantageous embodiment. The process in FIG. 6 may be implemented by a component such as number of tools 120 in FIG. 1 and/or tool 300 in FIG. 3.

The process begins by controlling a tool mechanism to perform a task using a number of process parameters (operation 602). A tool mechanism may be, for example, without limitation, a drill bit or fastener mechanism. The task performed may be, for example, without limitation, drilling a hole, fastening one component to another component, and/or any other suitable task. The process parameters may provide specified parameters for tool operation and/or for results from tool operation, for example.

The process collects process data during task performance (operation 604). The process data may be, for example, without limitation, visual data of the tool process and/or tool process results, such as the size of a hole drilled, for example. The process data may also be information about torque expended during a fastening operation by the tool, for example.

The process sends the process data collected to a remote location (operation 606). The remote location may be, for example, back office 104 in FIG. 1. The process may send the process data over a wireless network, such as network 102 in FIG. 1, for example.

The process determines whether a process update is received (operation 608). A process update may be received over the wireless network from a centralized, remote location, such as back office 104 in FIG. 1, for example. If a determination is made that a process update is not received, the process returns to operation 604.

If a determination is made that a process update is received, the process updates the number of process parameters using the process update received to form new process parameters (operation 610). The process then controls the tool mechanism to perform the task using the new process parameters (operation 612), with the process terminating thereafter.

The process in FIG. 6 may iteratively repeat as long as the tool is in operation, for example, receiving a number of process updates as needed during operation of the tool.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current systems for updating tool process parameters require the tools to be checked into a remotely located tool crib and updated manually when process parameters change. These updates occur locally when the tool is idle or inactive and placed into storage at the tool crib until needed again or until updates are complete. Remote updates may be sent to the tool crib, but the tool does not receive the update until it is checked into the crib after operations are finished.

The different advantageous embodiments further recognize and take into account that current methods for monitoring tool processes require human monitoring of an individual tool for visual inspection of results or tool parameter performance, for example. Some limited computer monitoring may be provided, with the results of tool processes analyzed after the processes are complete and the information has been downloaded or manually retrieved for analysis.

Thus, the different advantageous embodiments provide an enterprise-level network architecture for deployment of numerous smart tools, tools that electronically control process parameters and are equipped with sensors to report the resulting process parameters, to existing production programs. This system creates bi-directional communication between tools and a centralized administration system for uniform updates to process parameters and monitoring of tool processes.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
    an enterprise-level network architecture including a communication system;
    a first tool in communication with the communication system and configured to perform a first number of tasks using a first number of process parameters;
    a first sensor system in communication with the communication system and configured to collect first process data while the first tool performs the first number of tasks;
    a second tool in communication with the communication system and configured to perform a second number of tasks using a second number of process parameters, the second tool being different than the first tool, the second number of tasks being different than the first number of tasks, and the second number of process parameters being different than the first number of process parameters;
    a second sensor system in communication with the communication system and configured to collect second process data while the second tool performs the second number of tasks, the second sensor system being different than the first sensor system; and
    a central server that is part of the enterprise-level network architecture, the central server configured to monitor the first tool as the first tool performs the first number of tasks and also to monitor the second tool as the second tool performs the second number of tasks, the central server further configured to receive the first process data and the second process data, the central server further configured to analyze the first process data and the second process data to determine whether a process parameter update is needed for the first tool, for the second tool, or for both;
    wherein the enterprise-level network architecture further includes an authentication control server, and wherein the system further comprises:
    a first access point providing communication between the first tool and the authentication control server, wherein a first security certificate is associated with the first tool, and wherein the authentication control server is configured to authenticate the first tool using the first security certificate; and
    a second access point providing communication between the second tool and the authentication control server, wherein a second security certificate is associated with the second tool, and wherein the authentication control server is configured to authenticate the second tool using the second security certificate.

2. The system of claim 1, wherein the central server is configured to send the process parameter update to the first tool, to the second tool, or to both.

3. The system of claim 1, wherein the enterprise-level network architecture further comprises a data processing system configured to send the first process data and the second process data to the central server.

4. The system of claim 1, wherein the first tool further comprises a first data processing system in communication with the communication system and configured to receive a first number of process parameter updates from the central server while the first tool performs the first number of tasks, and wherein the second tool further comprises a second data processing system in communication with the communication system and configured to receive a second number of process parameter updates from the central server while the second tool performs the second number of tasks.

5. The system of claim 1, wherein the first tool and the second tool are selected from a contour drilling machine, a drill motor, and a fastener.

6. The system of claim 1, wherein the enterprise-level network architecture further includes a tool controller in communication with the communication system, and wherein the tool controller is configured to control the first tool to perform the first number of tasks and to control the second tool to perform the second number of tasks.

7. The system of claim 6, wherein the tool controller is configured to receive the process parameter update and is further configured to adjust control of at least one of the first tool and the second tool based on the process parameter update.

8. A method performed in an enterprise-level network architecture including a communication system, a first tool in communication with the communication system and configured to perform a first number of tasks using a first number of process parameters; a first sensor system in communication with the communication system and configured to collect first process data while the first tool performs the first number of tasks; a second tool in communication with the communication system and configured to perform a second number of tasks using a second number of process parameters, the second tool being different than the first tool, the second number of tasks being different than the first number of tasks, and the second number of process parameters being different than the first number of process parameters; a second sensor system in communication with the communication system and configured to collect second process data while the second tool performs the second number of tasks, the second sensor system being different than the first sensor system; and a central server that is part of the enterprise-level network architecture, the central server configured to monitor the first tool as the first tool performs the first number of tasks and also to monitor the second tool as the second tool performs the second number of tasks, the central server further configured to receive the first process data and the second process data, the central server further configured to analyze the first process data and the second process data to determine whether a process parameter update is needed for the first tool, for the second tool, or for both, the method comprising:

operating, using the central server, the first tool to perform the first number of tasks;

operating, using the central server, the second tool to perform the second number of tasks;

analyzing, using the central server, one of the first process data and the second process data using the central server; and determining, using the central server, whether the process parameter update is needed for the first tool, for the second tool, or for both;

wherein the enterprise-level network architecture further includes an authentication control server in communication with the communication system, and wherein the method further comprises:

providing communication between the first tool and the authentication control server using a first access point, wherein a first security certificate is associated with the first tool;

authenticating the first tool using the first security certificate and the authentication control server;

providing communication between the second tool and the authentication control server using a second access point, wherein a second security certificate is associated with the second tool; and authenticating the second tool using the second security certificate and the authentication control server.

9. The method of claim 8 further comprising:

sending the process parameter update to the first tool, to the second tool, or to both.

10. The method of claim 8, wherein the enterprise-level network architecture further comprises a data processing system configured to send the first process data and the second process data to the central server, and wherein the method further comprises:

sending the first process data and the second process data to the central server.

11. The method of claim 8, wherein the first tool further comprises a first data processing system in communication with the communication system and configured to receive a first number of process parameter updates from the central server while the first tool performs the first number of tasks, and wherein the second tool further comprises a second data processing system in communication with the communication system and configured to receive a second number of process parameter updates from the central server while the second tool performs the second number of tasks, the method further comprising:

receiving the first number of process parameter updates at the first tool while the first tool performs the first number of tasks; and receiving the second number of process parameter updates at the second tool while the second tool performs the second number of tasks.

12. The method of claim 8, wherein the enterprise-level network architecture further includes a tool controller in communication with the communication system, and wherein the method further comprises:

controlling the first tool with the tool controller to perform the first number of tasks; and controlling the second tool with the tool controller to perform the second number of tasks.

13. The method of claim 12 further comprising:

receiving, at the tool controller, the process parameter update; and adjusting, using the tool controller, control of at least one of the first tool and the second tool based on the process parameter update.

* * * * *